Dec. 26, 1961  J. E. KASTEN  3,014,738
ADJUSTABLE DRAWBARS
Filed Sept. 28, 1960
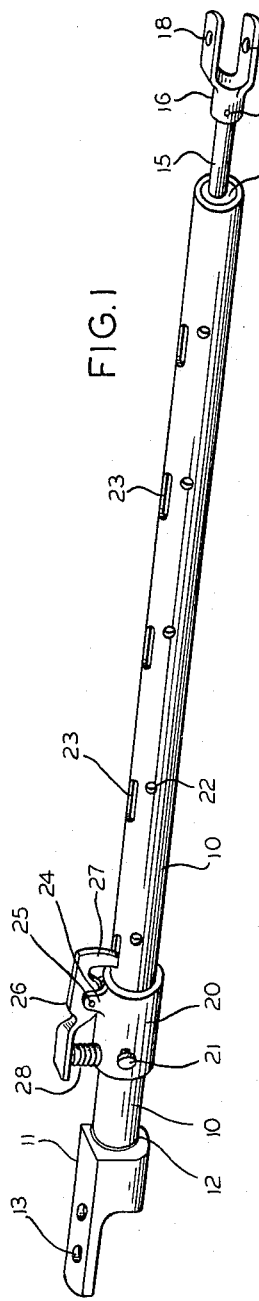
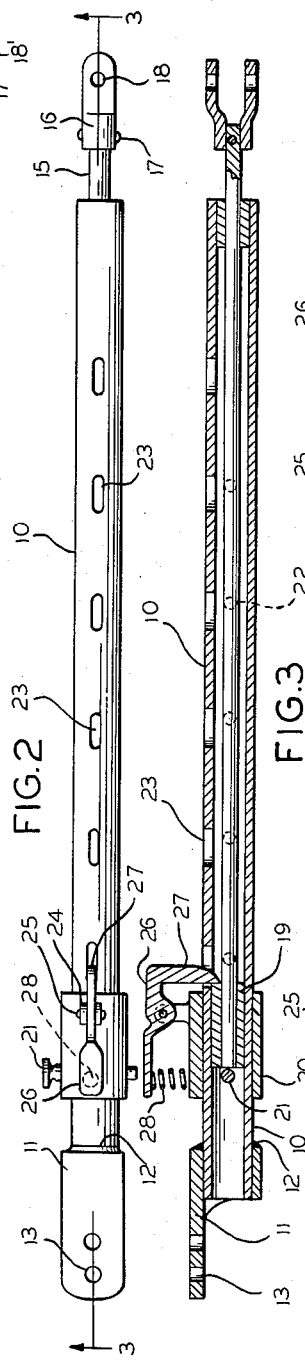
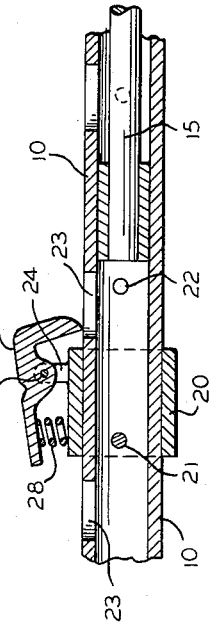
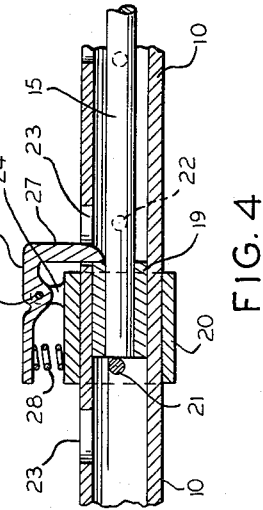
INVENTOR.
JOHN E. KASTEN
BY
ATTORNEY

3,014,738
ADJUSTABLE DRAWBARS
John E. Kasten, % Kasten Mfg. Corp., Allenton, Wis.
Filed Sept. 28, 1960, Ser. No. 59,010
3 Claims. (Cl. 280—482)

This invention relates to drawbars, and more particularly to a drawbar that may be readily adjusted in its length.

A principal object of the invention is to provide an adjustable drawbar characterized by a manually actuated latch for providing adjustment of the drawbar to any desired length, and maintaining the drawbar in a desired length.

Another object is to provide a drawbar comprising telescopic drawbar elements constructed for slidable adjustment.

Other and further objects of the invention will become apparent as the description proceeds, when taken in conjunction with the drawing, in which:

FIG. 1 is a perspective view of the improved drawbar according to the present invention;

FIG. 2 is a top view of the drawbar seen in FIG. 1;

FIG. 3 is a longitudinal cross-sectional view taken along the line 3—3 of FIG. 2, looking in the direction of the arrows;

FIG. 4 is a fragmentary longitudinal cross-sectional view to an enlarged scale, showing the latch assembly in an engaged position; and FIG. 5 is a view similar to FIG. 4 with the latch shown in a disengaged position.

Referring now to the drawing, the improved drawbar according to the present invention is referred to by the reference numeral 10 and comprises an outer first drawbar member for the device. Drawbar member 10 can be secured to a draft vehicle (not shown) by a coupling 11 welded at 12 to the draft member 10. Coupling device 11 may be of any conventional and convenient design and is provided with apertures 13 adapted to receive a coupling pin, not shown.

The draft member 10 is in telescoping relationship with inner second draft member 15 which is guided at the forward end of draft member 10 by an inner bushing 14. Inner draft member 15 may be either solid or tubular, and is provided with an attaching clevis 16 held to draft member 15 by a pin 17. Apertures 18 and 18' in the clevis 16 accommodate a coupling pin (not shown) for attachment of draft member 15 to a tractor or the like.

The inner end of draft member 15 is provided with a guide collar 19 which may be welded to rod 15 and the guide collar 19 is adapted to slide within the outer draft member 10.

The draft device according to the present invention is adapted to be held in a selected extended position by a latch assembly comprising a sleeve 20 encircling and slidably supported on the outer drawbar member 10. Sleeve 20 has diametrically spaced apertures which receive a removable pin 21 which also passes through diametrically spaced apertures 22 in the drawbar member 10. The apertures 22 are spaced throughout the length of drawbar member 10 at intervals, as are also elongated slots 23 on the top of the drawbar member 10. Slots 23 extend in a plane which is substantially normal to the pin 21 holding sleeve 20 in position on draft member 10.

The sleeve 20 is provided with a radially extending outer clevis 24 which receives a pivot pin 25. A latch 26 is supported on the clevis 24 and has a latching finger 27 adapted to enter a slot 23. The latch 26 is normally biased to a latching position by a spring 28 constrained between the sleeve 20 and the latch 26.

When the latch 26 is disengaged, the inner draft member 15 can be adjusted in position within outer draft member 10. The pin 21 at this time is preferably released so that the drawbar can be shortened if desired. When the latch 26 is re-engaged, the collar 19 can be held between the re-inserted pin 21 and the latch finger 27 so that the drawbar is fixed in its adjusted length.

From the above description it is believed evident that the device is simple in construction, easy to manipulate for extending or shortening the drawbar, and although I have shown a specific construction and arrangement of the parts consituting my invention, I am fully cognizant of the fact that many changes in the form, shape and configuration of the parts may be made without in any manner effecting their operativeness, and I reserve the rights to make such changes without departing from the spirit of my invention.

Having thus described my invention, what I claim and desire to secure by Letters Patent in the United States, is:

1. An adjustable drawbar comprising a first draft member and a second draft member, said draft members being in telescoping relationship and said second draft member telescoping within said first draft member, an enlarged diameter portion at the inner end of said second draft member for guiding the same within said first draft member, a plurality of diametrical openings spaced along said first draft member, a latching member supported on said first draft member and adapted to be moved to different positions therealong, openings in said latching member adapted to cooperate with said diametrical openings and having a pin passing through the openings in said latching member and selected diametrical openings on said first draft member to position said latching member on said first draft member, a plurality of latching openings in said first draft member, said latching openings being located in a plane extending along said first draft member substantially normal to the axis of said pin, a latching finger supported on said latching member and adapted to enter said latching opening, said pin and said latching finger constraining said enlarged diameter portion therebetween.

2. An adjustable drawbar comprising a first draft member and a second draft member, said draft members being in telescoping relationship and said second draft member telescoping within said first draft member, an enlarged diameter portion at the inner end of said second draft member for guiding the same within said first draft member, a plurality of openings spaced along said first draft member, a latching member supported on said first draft member and adapted to be moved to different positions therealong, openings in said latching member adapted to cooperate with said first named openings and having a pin passing through the openings in said latching member and selected of said first named openings on said first draft member to position said latching member on said first draft member, a plurality of latching openings in said first draft member, said latching openings being located in a plane extending along said first draft member substantially normal to the axis of said pin, a latching finger supported on said latching member and adapted to enter said latching opening, said pin and said latching finger constraining said enlarged diameter portion therebetween.

3. An adjustable drawbar comprising a first draft member and a second draft member, said draft members being in telescoping relationship and said second draft member telescoping within said first draft member, an enlarged diameter portion at the inner end of said second draft member for guiding the same within said first draft member, a plurality of diametrical openings spaced along said first draft member, a latching member supported on said first draft member and adapted to be moved to different positions therealong, openings in said latching member adapted to cooperate with said diametrical openings and having a pin passing through the openings in said latching member and selected diametrical openings on said first draft member to position said latching member on said first draft member, a plurality of latching openings in said first draft member, said latching openings being located in a plane extending along said first draft member substantially normal to the axis of said pin, a latching finger supported on said latching member and adapted to enter said latching opening, means for biasing said latching finger in a latching direction, said pin and said latching finger constraining said enlarged diameter portion therebetween.

References Cited in the file of this patent
UNITED STATES PATENTS

| | | |
|---|---|---|
| 2,366,294 | Stringer | Jan. 2, 1945 |
| 2,591,312 | Stees | Apr. 1, 1952 |